(12) United States Patent
Tsukahara et al.

(10) Patent No.: US 10,920,780 B2
(45) Date of Patent: Feb. 16, 2021

(54) ELECTRICALLY DRIVEN COMPRESSOR MOUNTED ON A VEHICLE ENGINE HAVING A WEIGHT INSIDE TO SHIFT THE RESONANCE FREQUENCY OF THE COMPRESSOR FROM THAT OF THE ENGINE

(71) Applicant: KABUSHIKI KAISHA TOYOTA JIDOSHOKKI, Kariya (JP)

(72) Inventors: Masato Tsukahara, Kariya (JP); Kazuhiro Onara, Kariya (JP); Shigehiro Kasho, Kariya (JP); Tatsuya Koide, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 208 days.

(21) Appl. No.: 15/916,344

(22) Filed: Mar. 9, 2018

(65) Prior Publication Data
US 2018/0258935 A1 Sep. 13, 2018

(30) Foreign Application Priority Data
Mar. 10, 2017 (JP) .................. 2017-046173

(51) Int. Cl.
*F04C 29/06* (2006.01)
*F04C 18/02* (2006.01)
(Continued)

(52) U.S. Cl.
CPC .............. *F04C 29/06* (2013.01); *F04B 19/20* (2013.01); *F04B 39/0027* (2013.01);
(Continued)

(58) Field of Classification Search
CPC ................ F04C 29/06; F04C 2240/807; F04C 2270/125; F04C 29/00; F04C 29/026;
(Continued)

(56) References Cited

U.S. PATENT DOCUMENTS 4,475,875 A * 10/1984 Sugimoto ............. F01C 1/0215
418/151
5,740,701 A * 4/1998 Hauser .................... D06F 37/40
403/331
(Continued)

FOREIGN PATENT DOCUMENTS

JP 10-205447 A 8/1998
JP 2009-293523 A 12/2009
(Continued)

*Primary Examiner* — Bryan M Lettman
*Assistant Examiner* — Timothy P Solak
(74) *Attorney, Agent, or Firm* — Sughrue Mion, PLLC

(57) ABSTRACT

An electrically-driven compressor is installed on an engine. Refrigerant is compressed with rotation of a rotating shaft in a compression unit. An electric motor is coupled to the rotating shaft and drives the compression unit through the rotating shaft. A housing accommodates the compression unit, the electric motor, and the motor drive circuit aligned in the listed order in the axial direction of the rotating shaft. The housing is internally provided with the discharge chamber through which the refrigerant compressed by the compression unit is discharged. A weight is attached to the housing and disposed in the discharge chamber in a manner that a resonance frequency of the electrically-driven compressor is shifted relative to a resonance frequency of the engine, the weight including a material having a specific gravity greater than a specific gravity of a constituent material of the housing.

3 Claims, 8 Drawing Sheets

(51) Int. Cl.
    *F04C 23/00*     (2006.01)
    *F04C 29/02*     (2006.01)
    *F04C 23/02*     (2006.01)
    *F16F 7/10*      (2006.01)
    *F04B 19/20*     (2006.01)
    *F04B 53/00*     (2006.01)
    *F04B 53/16*     (2006.01)
    *F04B 39/00*     (2006.01)
    *F16F 15/02*     (2006.01)

(52) U.S. Cl.
    CPC ............ *F04B 53/001* (2013.01); *F04B 53/16* (2013.01); *F04C 18/0215* (2013.01); *F04C 23/008* (2013.01); *F04C 23/02* (2013.01); *F04C 29/026* (2013.01); *F04C 29/068* (2013.01); *F16F 7/10* (2013.01); *F16F 15/02* (2013.01); *F04C 2240/30* (2013.01); *F04C 2240/807* (2013.01); *F04C 2270/125* (2013.01); *F04C 2270/135* (2013.01); *F04C 2270/155* (2013.01)

(58) Field of Classification Search
    CPC ............ F04C 29/068; F04C 2270/135; F04C 2270/13; F04C 2270/15; F04C 2270/155; F04B 19/20; F16F 2228/04
    See application file for complete search history.

(56) References Cited

U.S. PATENT DOCUMENTS

| | | | |
|---|---|---|---|
| 2008/0141693 A1* | 6/2008 | Enami | F04C 18/3564 62/228.4 |
| 2009/0304539 A1* | 12/2009 | Kii | F04C 18/0215 418/55.6 |
| 2013/0075209 A1* | 3/2013 | Semura | F16F 7/104 188/379 |
| 2013/0209305 A1* | 8/2013 | Takei | F04C 18/0215 418/55.3 |
| 2015/0192126 A1* | 7/2015 | Nagano | F04C 29/12 417/410.5 |

FOREIGN PATENT DOCUMENTS

| | | |
|---|---|---|
| JP | 2013-68295 A | 4/2013 |
| JP | 2015-129468 A | 7/2015 |

\* cited by examiner

ELECTRICALLY DRIVEN COMPRESSOR MOUNTED ON A VEHICLE ENGINE HAVING A WEIGHT INSIDE TO SHIFT THE RESONANCE FREQUENCY OF THE COMPRESSOR FROM THAT OF THE ENGINE

This nonprovisional application is based on Japanese Patent Application No. 2017-046173 filed on Mar. 10, 2017, with the Japan Patent Office, the entire content of which is hereby incorporated by reference.

BACKGROUND OF THE INVENTION

Field of the Invention

The present invention relates to an electrically-driven compressor for a vehicle.

Description of the Background Art

Japanese Patent Laying-Open No. 2009-293523 discloses an electrically-driven compressor which reduces noise and vibration. The electrically-driven compressor disclosed in Japanese Patent Laying-Open No. 2009-293523 includes a housing, a compression mechanism, an electric motor, a rotating shaft, and a bearing support member. A vibro-isolating material having a thin plate shape is provided between the housing and the bearing support member.

An electrically-driven compressor for a vehicle is installed primarily in an engine. When the resonance frequency of the engine and the resonance frequency of the electrically-driven compressor are coincident, noise and vibration of the engine and the electrically-driven compressor are increased at this resonance frequency. Moreover, there is a demand for smaller electrically-driven compressors for vehicle for the sake of improved mountability. Therefore, for example, thickening the wall of the housing of the electrically-driven compressor or adding reinforcement ribs in order to shift the resonance frequency of the engine and the resonance frequency of the electrically-driven compressor from each other to attenuate the vibration leads to an increase in size of the electrically-driven compressor, which is not desirable.

SUMMARY OF THE INVENTION

A primary object of the present invention is to provide an electrically-driven compressor for a vehicle which has a reduced size and achieves attenuated vibration.

The electrically-driven compressor for a vehicle based on the present invention is configured to be installed in an engine. The electrically-driven compressor for a vehicle includes a compression unit, an electric motor, a motor drive circuit, and a housing. Refrigerant is compressed with rotation of a rotating shaft in the compression unit. The electric motor is coupled to the rotating shaft and drives the compression unit through the rotating shaft. The motor drive circuit drives the electric motor. The housing accommodates the compression unit, the electric motor, and the motor drive circuit aligned in the listed order in the axial direction of the rotating shaft. A discharge chamber is provided in the housing. The refrigerant gas compressed by the compression unit is discharged through the discharge chamber. A weight is attached to the housing and disposed in the discharge chamber in a manner that a resonance frequency of the electrically-driven compressor for a vehicle is shifted relative to a resonance frequency of the engine where the electrically-driven compressor for a vehicle is installed, the weight composed of a material having a specific gravity greater than a specific gravity of a constituent material of the housing.

Accordingly, due to the electrically-driven compressor for a vehicle of the present invention, size reduction and attenuation of vibration is achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
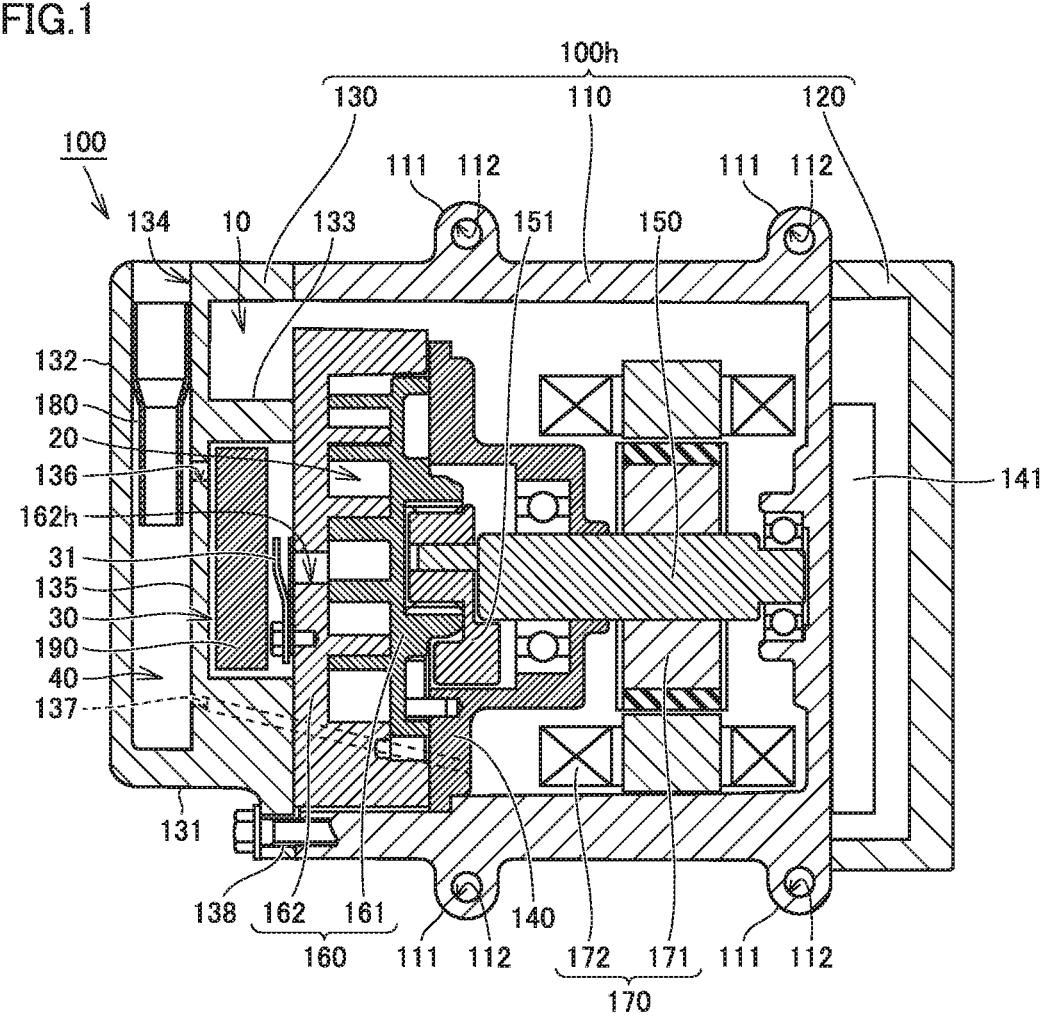
FIG. 1 is a cross-sectional view of an electrically-driven compressor for a vehicle configuration according to one embodiment of the present invention.

In the following, an electrically-driven compressor for a vehicle according to one embodiment of the present invention is described, with reference to the accompanying drawings. In the description below, the same reference sign is used to refer to the same or corresponding component in the drawings, and description thereof will not be repeated. While an embodiment will be described below with reference to a scroll electrically-driven compressor, the type of the electrically-driven compressor is not limited to the scroll type, and the electrically-driven compressor may be of a vane type or a swash plate type.

Figure 2:
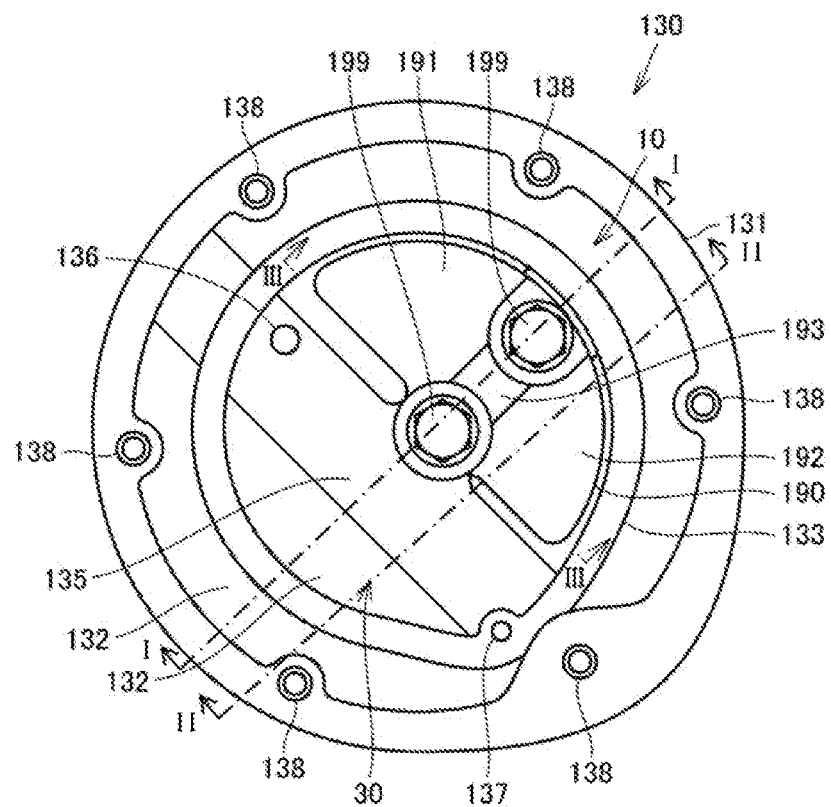
FIG. 2 is a front view of a housing included in the electrically-driven compressor for a vehicle according to the embodiment of the present invention, the housing having a weight secured thereto.
Figure 3:
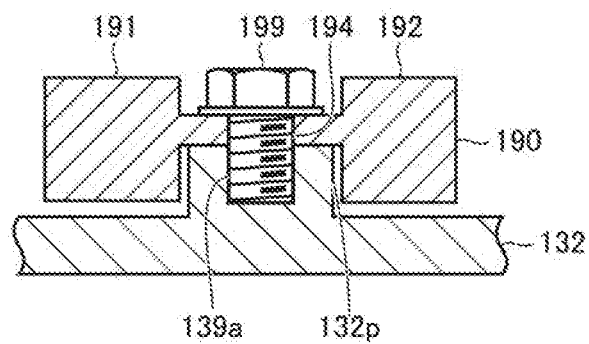
FIG. 3 is a cross section of the housing, taken along a line of FIG. 2.
Figure 4:
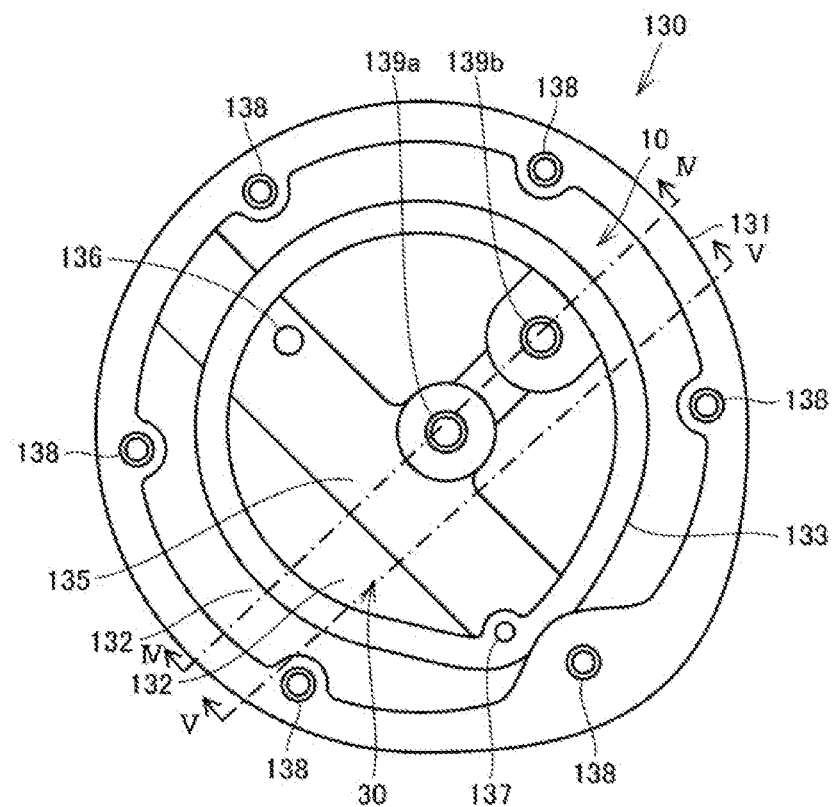
FIG. 4 is a front view of the housing structure included in the electrically-driven compressor for a vehicle according to the embodiment of the present invention.
Figure 5:
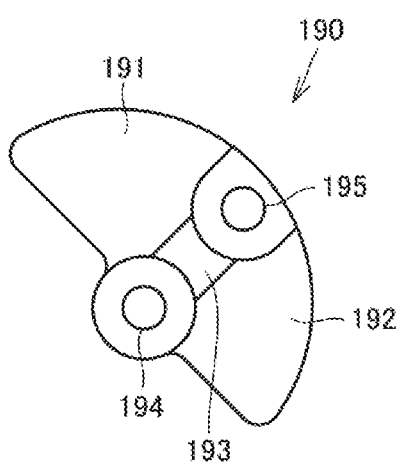
FIG. 5 is a front view of the weight structure included in the electrically-driven compressor for a vehicle according to the embodiment of the present invention.
Figure 6:
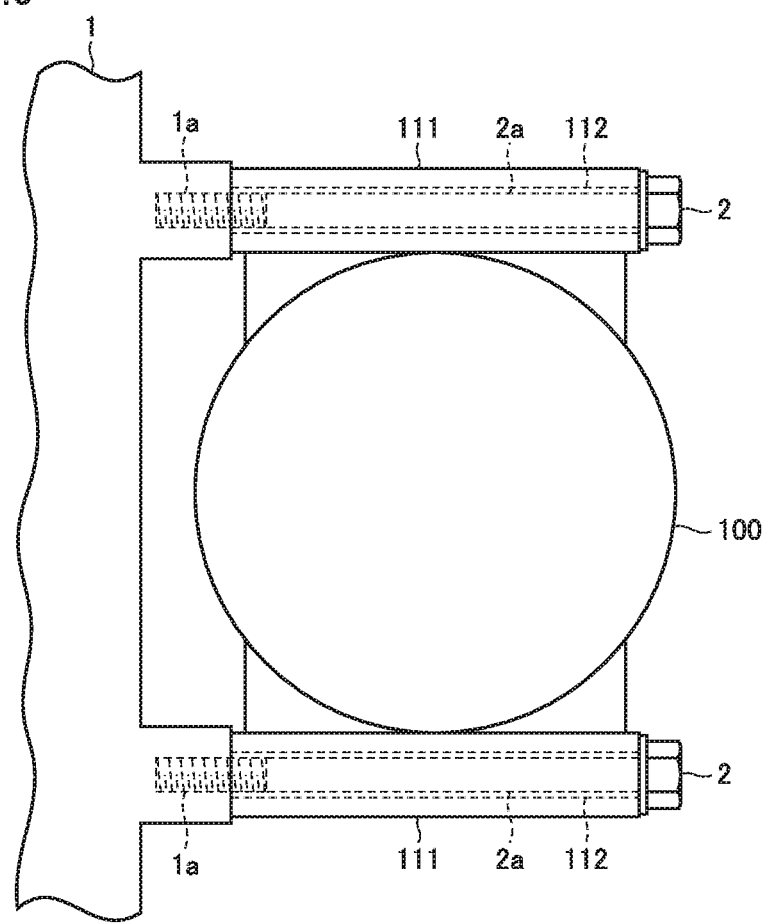
FIG. 6 is a front view of the electrically-driven compressor for a vehicle according to the embodiment of the present invention, when installed in an engine.
Figure 7:
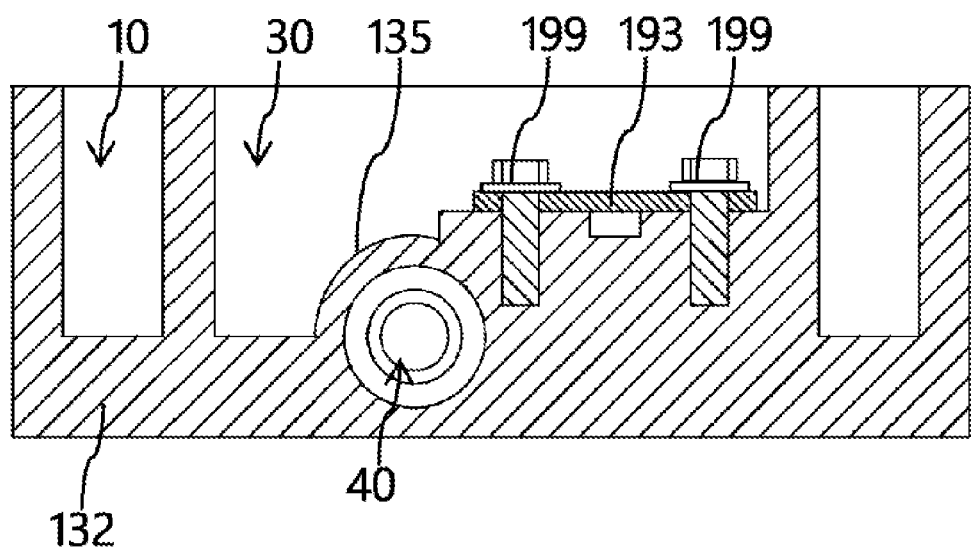
FIG. 7 is a cross section of the housing, taken along a line I-I of FIG. 2.
Figure 8:
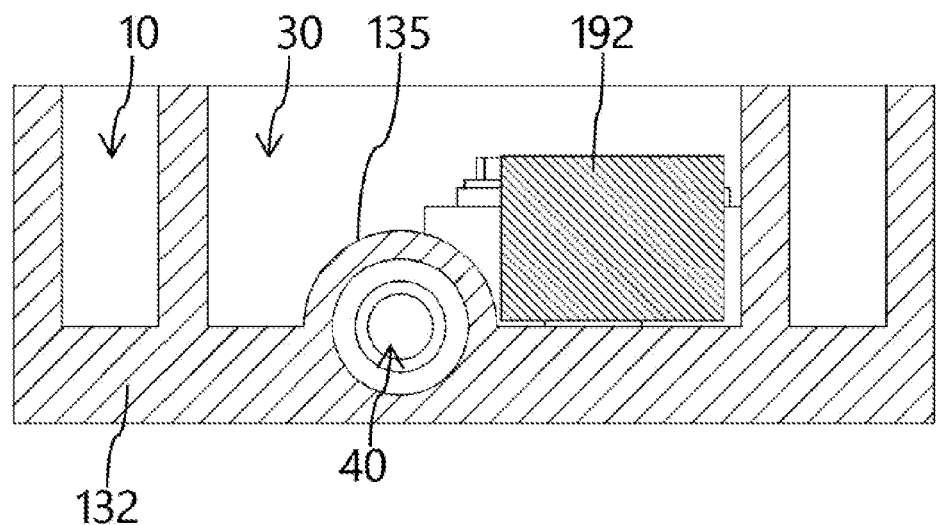
FIG. 8 is a cross section of the housing structure, taken along a line II-II of FIG. 2.
Figure 9:
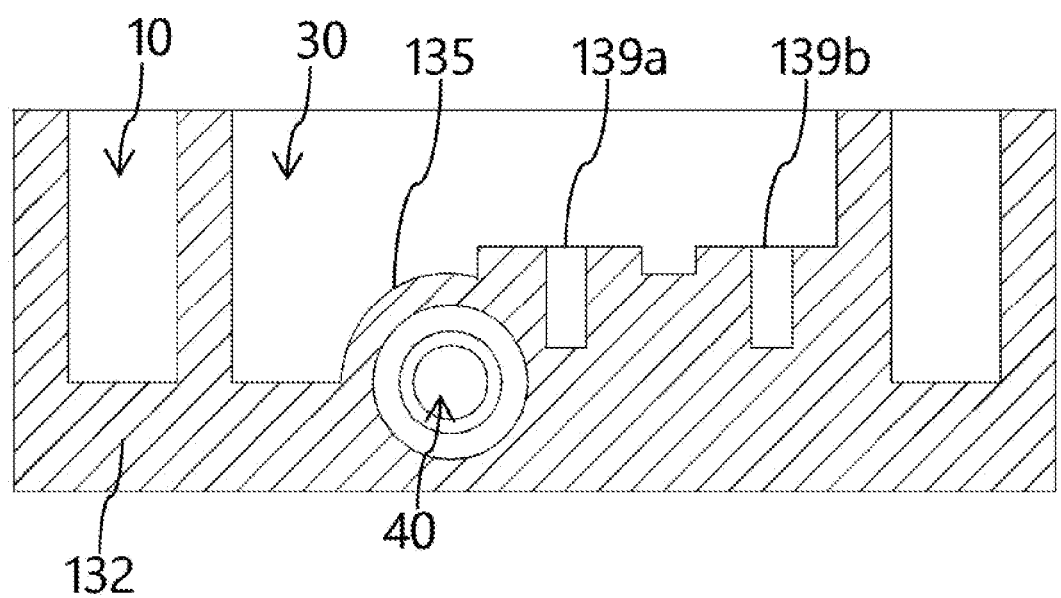
FIG. 9 is a cross section of the housing structure, taken along a line IV-IV of FIG. 4.
Figure 10:
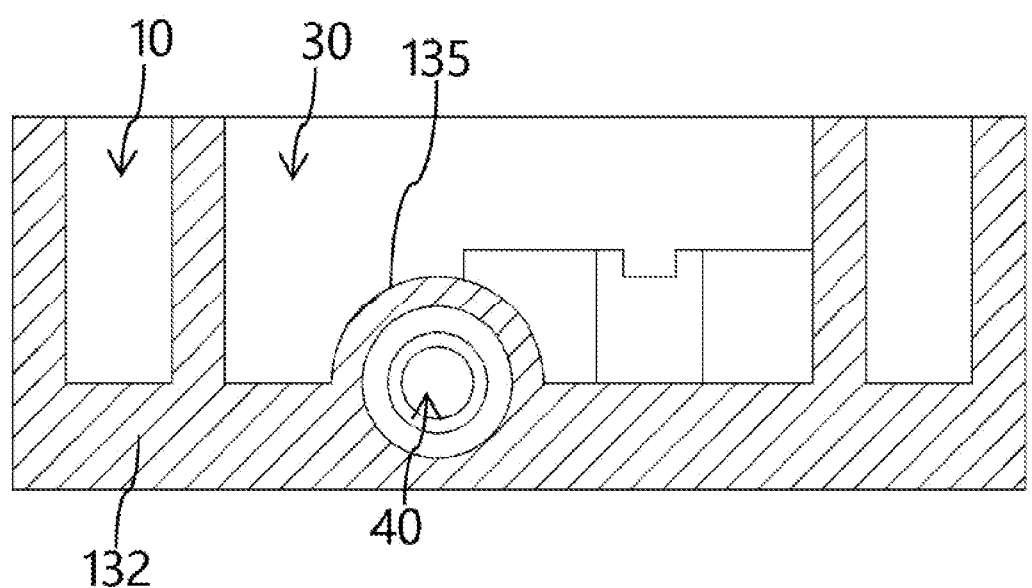
FIG. 10 is a cross section of the housing structure, taken along a line V-V of FIG. 4.

FIG. 1 is a cross-sectional view of the electrically-driven compressor for a vehicle configuration according to the embodiment of the present invention. FIG. 2 is a front view of a housing included in the electrically-driven compressor for a vehicle according to the embodiment of the present invention, the housing having a weight secured thereto. FIG. 3 is a cross section of the housing, taken along a line of FIG. 2. FIG. 4 is a front view of the housing structure included in the electrically-driven compressor for a vehicle according to the embodiment of the present invention. FIG. 5 is a front view of the weight structure included in the electrically-driven compressor for a vehicle according to the embodiment of the present invention. FIG. 6 is a front view of the electrically-driven compressor for a vehicle according to the embodiment of the present invention, when installed in an engine. FIG. 7 is a cross section of the housing, taken along a line I-I of FIG. 2. FIG. 8 is a cross section of the housing structure, taken along a line II-II of FIG. 2. FIG. 9 is a cross section of the housing structure, taken along a line IV-IV of FIG. 4. FIG. 10 is a cross section of the housing structure, taken along a line V-V of FIG. 4.

As shown in FIGS. 1 to 10, an electrically-driven compressor 100, which is the electrically-driven compressor for a vehicle according to the embodiment of the present invention, is configured to be installed in an engine 1. The electrically-driven compressor 100 includes a compression unit 160, an electric motor 170, a motor drive circuit 141, and a housing 100h. Refrigerant is compressed with rotation of a rotating shaft 150 in the compression unit 160. The electric motor 170 is coupled to the rotating shaft 150, and drives the compression unit 160 through the rotating shaft 150. The motor drive circuit 141 drives the electric motor 170.

The housing 100h includes a motor housing 110, a front housing 120, and a rear housing 130. The motor housing 110, the front housing 120, and the rear housing 130 each have a bottomed cylindrical shape. The motor housing 110, the front housing 120, and the rear housing 130 each is composed of aluminum alloy. However, the materials of the motor housing 110, the front housing 120, and the rear housing 130 are not limited to aluminum alloy, and may be any other metal or alloy.

The motor housing 110 has one end coupled to the front housing 120 and the other end coupled to the rear housing 130. The motor housing 110 has a bottom wall arranged to close the opening of the front housing 120. An open end of the motor housing 110 and an open end of the rear housing 130 are coupled to each other.

As shown in FIG. 1, the motor housing 110 and the rear housing 130 are bolted to each other. As shown in FIGS. 1, 2, and 4, the outer periphery of the rear housing 130 is provided with through-holes 138 for insertion of bolts therethrough.

As shown in FIGS. 1 and 6, vertically upper and lower portions of the motor housing 110 are each provided with attachment legs 111 for installing the electrically-driven compressor 100 into the engine 1. The attachment legs 111 are each provided with a through-hole 112 for insertion of a bolt 2 therethrough for installing the electrically-driven compressor 100 into the engine 1.

As shown in FIG. 1, the housing 100h accommodates the compression unit 160, the electric motor 170, and the motor drive circuit 141 aligned in the listed order in the axial direction of the rotating shaft 150. The motor housing 110 accommodates the compression unit 160, the electric motor 170, and a fixed block 140 disposed between the compression unit 160 and the electric motor 170.

The motor drive circuit 141 is disposed in a space defined by the motor housing 110 and the front housing 120. The motor drive circuit 141 is electrically connected to the electric motor 170.

The electric motor 170 includes a rotor 171 and a stator 172. The rotor 171 is coupled to the rotating shaft 150. The rotating shaft 150 is supported by the bottom wall of the motor housing 110 and the fixed block 140. An eccentric pin is provided at an end portion of the rotating shaft 150 within the fixed block 140. The eccentric pin fits a balancer-integrated bush 151.

The compression unit 160 includes an orbiting scroll 161 and a fixed scroll 162. The orbiting scroll 161 and the fixed scroll 162 define a compression chamber 20 therebetween. The orbiting scroll 161 is coupled to the balancer-integrated bush 151. The fixed scroll 162 is provided with a discharge port 162h. The fixed scroll 162 has a valve unit 31 attached thereto. The valve unit 31 opens and closes the discharge port 162h.

As shown in FIGS. 1, 2, and 4, the rear housing 130 includes an outer peripheral wall 131, an end wall 132, and an inner peripheral wall 133. The outer peripheral wall 131, the end wall 132, and the inner peripheral wall 133 are formed integrally in one piece. The outer peripheral wall 131 has a cylindrical shape having one end open and the other end closed by the end wall 132. The inner peripheral wall 133 is provided within the outer peripheral wall 131, and has a cylindrical shape having one end open and the other end closed by the end wall 132. The end wall 132 is connected to the other end of the outer peripheral wall 131 and the other end of the inner peripheral wall 133.

As shown in FIG. 1, the vertically upper portion of the end wall 132 is provided with a discharge port 134 that is open to the outside of the electrically-driven compressor 100. The discharge port 134 is open in the outer peripheral surface of the end wall 132 and is in communication with an external refrigerant circuit (not shown) external to the electrically-driven compressor 100.

The motor housing 110 includes a suction port (not shown) therethrough, and space in the motor housing 110 is a suction space. The inner peripheral surface of the outer peripheral wall 131, the outer peripheral surface of the inner peripheral wall 133, and the end wall 132 define a space in the rear housing 130. The space is connected to the suction space in the motor housing 110, thereby forming a suction chamber 10. Refrigerant to be compressed by the compression unit 160 is sucked from outside into the suction chamber 10.

The inner peripheral surface of the annular inner peripheral wall 133, the end wall 132, and the fixed scroll 162 define a discharge chamber 30. The discharge chamber 30 and the suction chamber 10 are partitioned by the inner peripheral wall 133, wherein the discharge chamber 30 and the annular suction chamber 10 are located on the inner peripheral side and the outer peripheral side, respectively, of the rear housing 130. An oil separation chamber 40 is provided in the rear housing 130. The oil separation chamber 40 is in communication with the discharge chamber 30 and includes an oil separator cylinder 180 therein. The refrigerant gas compressed by the compression unit 160 is discharged through the discharge chamber 30 into the oil separation chamber 40. In the oil separation chamber 40, lubricating oil is separated from the refrigerant gas discharged from the discharge chamber 30.

Specifically, a partition 135, which is a portion of the end wall 132, is positioned between the discharge chamber 30 and the oil separation chamber 40. The partition 135 constitutes a portion of the peripheral wall of the cylindrical oil separation chamber 40. Therefore, the partition 135 has a cross-sectional shape that is arcuate, curved according to the shape of the oil separation chamber 40, and is bulging out in the axial direction of the rotating shaft 150. The oil separation chamber 40 extends in a direction intersecting the axial direction of the rotating shaft 150. The partition 135 also extends along the oil separation chamber 40 in the direction intersecting the axial direction of the rotating shaft 150. The refrigerant gas discharged from the discharge chamber 30 flows into the oil separation chamber 40 through a communication hole 136 provided in the partition 135.

The lubricating oil is centrifugally separated as the refrigerant gas swirls along the outer peripheral surface of the oil separator cylinder 180 in the oil separation chamber 40. The refrigerant gas from which the lubricating oil has been separated in the oil separation chamber 40 passes through the oil separator cylinder 180 and is discharged from the discharge port 134 to the outside.

The lubricating oil accumulated in the oil separation chamber 40 refluxes into the suction chamber 10 via an oil passage 137 passing through the rear housing 130, the fixed scroll 162, and the fixed block 140.

As shown in FIGS. 1 to 3, a weight 190 is provided in the discharge chamber 30. The weight 190 includes a material having a specific gravity greater than that of the constituent material of the housing 100h. The weight 190 includes iron. Note that the iron may be a ferrous material having various elements added thereto. Note that the material of the weight 190 is not limited to iron, insofar as it has a specific gravity greater than that of the constituent material of the housing 100h.

The weight 190 is attached to the end wall 132 of the rear housing 130. The weight 190 is fastened to the end wall 132 by screws 199 as fastening members. While the weight 190 is secured by two screws 199 in the present embodiment, the number of screws 199 is not limited to two and at least one screw 199 may be used.

As shown in FIGS. 2 and 5, the weight 190 includes a first weight portion 191 and a second weight portion 192 that are fan-shaped, and a coupling member 193 coupling the first weight portion 191 and the second weight portion 192. The weight 190 has a generally semi-cylindrical profile. A gap is provided between the end wall 132 and the end faces of the first weight portion 191 and the second weight portion 192 that face the end wall 132. A portion of the peripheral surface of the weight 190 is along the inner peripheral surface of the inner peripheral wall 133 of the rear housing 130. A gap is provided between the inner peripheral surface of the inner peripheral wall 133 and the peripheral surfaces of the first weight portion 191 and the second weight portion 192 that face the inner peripheral surface of the inner peripheral wall 133. The coupling member 193 is provided with a through-hole 194 and a through-hole 195 each for insertion of the screw 199 therethrough.

The end wall 132 of the rear housing 130 is provided with female screws in the form of fastener holes that are threadedly engaged with the screws 199. Specifically, the end wall 132 is provided with a female screw 139a corresponding to the through-hole 194 in the weight 190, and a female screw 139b corresponding to the through-hole 195 in the weight 190. Note that the female screw 139a and the female screw 139b are provided in projections 132p which are portions of the end wall 132 that are projecting toward the compression unit 160. The female screw 139a is provided, overlapping with the partition 135.

As shown in FIG. 6, the bolts 2, inserted in the through-holes 112 in the respective attachment legs 111, and female screws 1a, provided in the wall of the engine 1, are threadedly engaged, thereby installing the electrically-driven compressor 100 in the engine 1.

As shown in FIG. 1, in the electrically-driven compressor 100, as the electric motor 170 is driven by the motor drive circuit 141, rotational force is generated by the electric motor 170, and is conveyed to the orbiting scroll 161 through the rotating shaft 150 and the balancer-integrated bush 151. This causes the orbiting scroll 161 to revolve relative to the fixed scroll 162, thereby actuating the compression unit 160. The refrigerant compressed in the compression chamber 20 pushes open the valve unit 31 and flows into the discharge chamber 30. The refrigerant gas flowed in the discharge chamber 30 passes through the communication hole 136 and flows into the oil separation chamber 40. The refrigerant gas is separated from the lubricating oil in the oil separation chamber 40, then passes through the oil separator cylinder 180, and is discharged from the discharge port 134 to the outside.

Owing to the fact that the electrically-driven compressor 100 includes the weight 190 attached to the rear housing 130, the resonance frequency of the electrically-driven compressor 100 is shifted relative to the resonance frequency of the engine 1 where the electrically-driven compressor 100 is installed. As a result, noise and vibration of the engine 1 and the electrically-driven compressor 100 can be prevented from increasing.

Since the weight 190 is disposed in the discharge chamber 30, existing space can be utilized, inhibiting the housing 100h from increasing in size. Moreover, since the discharge chamber 30 is at one end of the electrically-driven compressor 100 in the axial direction of the rotating shaft 150, which one end is distant from the electric motor 170 that includes the center of gravity of the electrically-driven compressor 100, the resonance frequency of the electrically-driven compressor 100 is allowed to be effectively shifted relative to the resonance frequency of the engine 1.

Further, the rear housing 130 in which the discharge chamber 30 is formed can be easily disassembled from the motor housing 110 by removing bolts, thereby allowing the weight 190 disposed in the discharge chamber 30 to be easily removed from the electrically-driven compressor 100. Therefore, even if the weight 190 needs to be changed due to, for example, changes in the engine in which the electrically-driven compressor 100 is installed, the weight 190 can be easily replaced with another.

Since in the electrically-driven compressor 100, the housing 100h accommodates the compression unit 160, the electric motor 170, and the motor drive circuit 141 aligned in the listed order in the axial direction of the rotating shaft 150, the components included in the electrically-driven compressor 100 can be put together to reduce the size of the electrically-driven compressor 100. On the other hand, the arrangements of the components in the housing 100h are greatly limited. Thus, in the electrically-driven compressor 100 according to the present embodiment, the space in the discharge chamber 30 is efficiently used by disposing the weight 190 therein, thereby allowing for optimal placement of the weight 190, while inhibiting the electrically-driven compressor 100 having a reduced size from increasing in its profile.

Since the weight 190 includes a material having a specific gravity greater than that of the constituent material of the housing 100h, the amount of volume occupied by the weight 190 within the housing 100h can be reduced, as compared to the weight 190 when including a material having the same specific gravity as that of the constituent material of the housing 100h. This can also inhibit the housing 100h from increasing in size.

Since the weight 190 is secured to the end wall 132, the distance from the electric motor 170, which includes the center of gravity of the electrically-driven compressor 100 and also the source of vibration caused by the rotation of the rotor 171, to the secured point of the weight 190 can be maximized. As a result, the resonance frequency of the electrically-driven compressor 100 can be effectively shifted relative to the resonance frequency of the engine 1, thereby attenuating vibration and noise.

The weight 190 is fastened to the end wall 132 by the screws 199. Thus, as compared to fixing the weight 190 to the end wall 132 by welding, there is no heat effect on the housing 100h as well as no need for securing a space for the welding operation in the housing 100h. This can inhibit the housing 100h from increasing in size, while eliminating heat effects that can cause deformation of the housing 100h.

Since the coupling member 193 that is fastened by the screws 199 is provided between the first weight portion 191 and the second weight portion 192 in the weight 190, the first weight portion 191 and the second weight portion 192 are stably held by the axial force of the screws 199.

Since the female screw 139a is provided, overlapping with the partition 135, the weight 190 can be disposed in the portion of the space of the discharge chamber 30, which portion is formed along the bulging portion of the partition 135, thereby making an efficient use of the curved shape of the partition 135. As a result, the space in the discharge chamber 30 can be used efficiently, while inhibiting the housing 100h from increasing in size.

Moreover, since the portion of the peripheral surface of the weight 190 is along the inner peripheral surface of the inner peripheral wall 133 of the rear housing 130, the weight 190 can be efficiently disposed in the discharge chamber 30, while inhibiting the housing 100h from increasing in size.

As described above, according to the electrically-driven compressor 100 of the embodiment of the present invention, the resonance frequency of the engine 1 and the resonance frequency of the electrically-driven compressor 100 are shifted from each other to allow attenuation of vibration and noise, while achieving reduction in size of the electrically-driven compressor 100.

Moreover, the electrically-driven compressor 100 includes the weight 190 and thus has an increased weight. Compression load that is generated due to compression of refrigerant gas when the electrically-driven compressor 100 is driven is represented by a product of the weight and acceleration of the electrically-driven compressor 100. Therefore, an increase of the weight of the electrically-driven compressor 100 decreases the acceleration of the electrically-driven compressor 100. As a result, the compression load caused by the electrically-driven compressor 100 is made difficult to be conveyed to the engine 1.

In the electrically-driven compressor 100 according to the present embodiment, the weight 190 is secured to the end wall 132 by the screws 199. However, the present invention is not limited thereto. The weight 190 and the rear housing 130 may be formed integrally in one piece by insert molding the weight 190 into the rear housing 130. Moreover, while the discharge chamber 30 is located radially inside the suction chamber 10 in the rear housing 130, the suction chamber 10 may be located radially inside the discharge chamber 30.

While the embodiment according to the present invention has been described above, the embodiment presently disclosed should be considered in all aspects illustrative and not restrictive. The scope of the present invention is defined by the appended claims. All changes which come within the meaning and range of equivalency of the appended claims are to be embraced within their scope.

What is claimed is:

1. An electrically-driven compressor for a vehicle configured to be installed on an engine, comprising:
   a compression unit in which refrigerant is compressed with rotation of a rotating shaft;
   an electric motor which is coupled to the rotating shaft and drives the compression unit through the rotating shaft;
   a motor drive circuit which drives the electric motor; and
   a housing which accommodates the compression unit, the electric motor, and the motor drive circuit aligned in listed order in an axial direction of the rotating shaft,
   the housing being internally provided with a discharge chamber through which the refrigerant compressed by the compression unit is discharged,
   the housing including a weight which is attached to the housing and disposed in the discharge chamber in a manner that a resonance frequency of the electrically-driven compressor is shifted relative to a resonance frequency of the engine where the electrically-driven compressor is installed, the weight composed of a material having a specific gravity greater than a specific gravity of a constituent material of the housing, wherein
   the housing includes an inner peripheral wall and an end wall connected to the inner peripheral wall, the inner peripheral wall and the end wall defining the discharge chamber,
   the weight is attached to the end wall,
   the weight is fastened to the end wall by a screw,
   the weight includes a first weight portion and a second weight portion that are fan-shaped, and a coupling member coupling the first weight portion and the second weight portion,
   the coupling member having a through-hole in which the screw is inserted,
   the housing is internally provided with an oil separation chamber in which an oil separator cylinder is disposed, the oil separation chamber being in communication with the discharge chamber,
   the end wall is provided with a female screw which is threadedly engaged with the screw,
   the female screw is provided, overlapping with a partition between the discharge chamber and the oil separation chamber in the end wall,
   each of the first weight portion and the second weight portion is disposed in a portion of a space of the discharge chamber, the portion of the space formed along a bulging portion of the partition that bulges out in the axial direction towards the discharge chamber, and
   the bulging portion is a portion of the end wall that defines a portion of the discharge chamber and constitutes a portion of a peripheral wall of the oil separation chamber.

2. The electrically-driven compressor for the vehicle according to claim 1, wherein
   the housing is internally provided with a suction chamber into which the refrigerant to be compressed by the compression unit is sucked from outside,
   the discharge chamber and the suction chamber are partitioned by the inner peripheral wall, and
   the weight has a peripheral surface a portion of which is along the inner peripheral surface of the inner peripheral wall.

3. The electrically-driven compressor for the vehicle according to claim 1, wherein
the housing is composed of aluminum alloy, and
the weight is composed of iron.

* * * * *